his man-
UNITED STATES PATENT OFFICE.

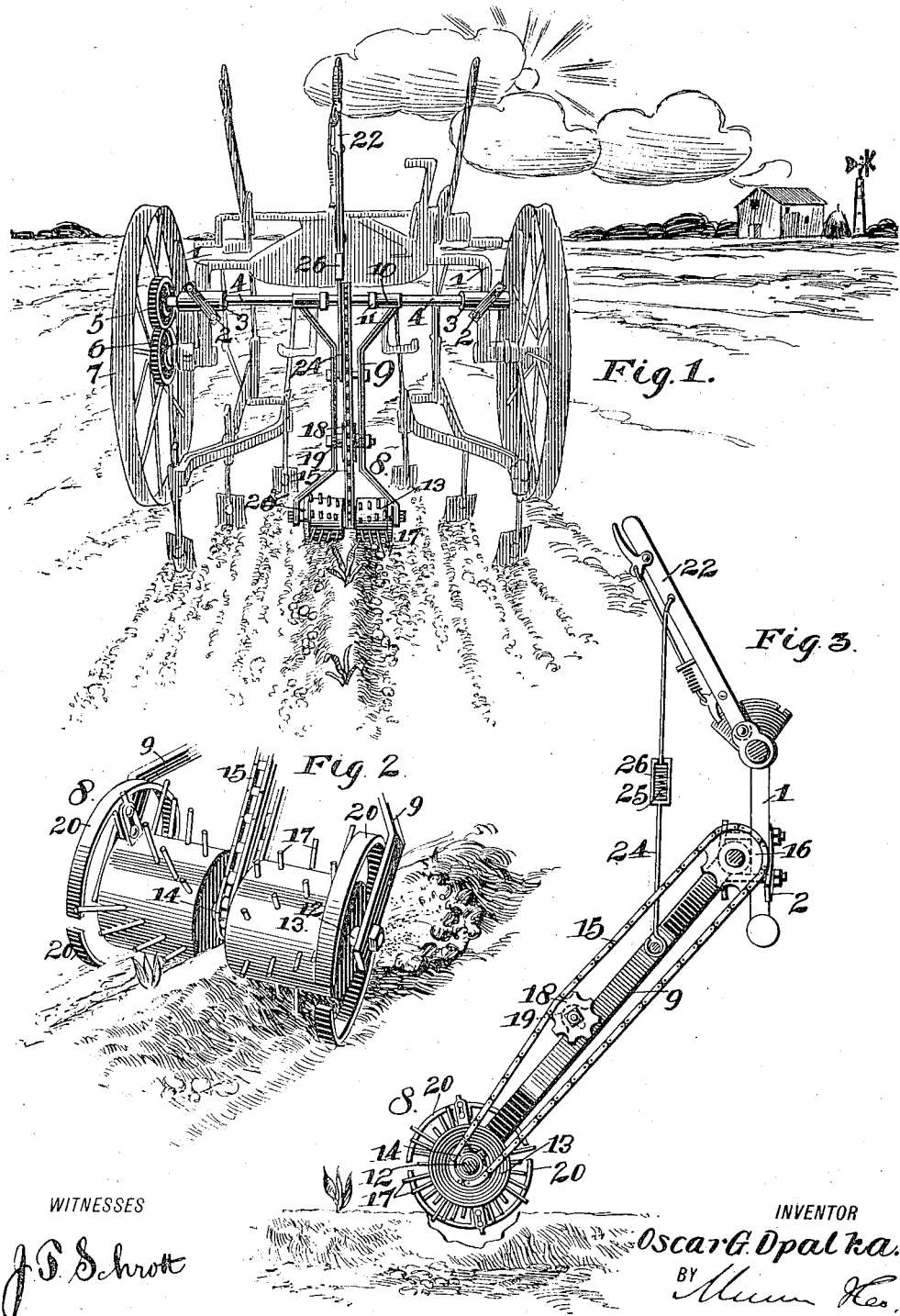

OSCAR G. OPALKA, OF CAMBRIDGE, ILLINOIS.

CORN-UNCOVERER.

1,289,884.  Specification of Letters Patent.  Patented Dec. 31, 1918.

Application filed August 12, 1918. Serial No. 249,445.

*To all whom it may concern:*

Be it known that I, OSCAR G. OPALKA, a citizen of the United States, and a resident of Cambridge, in the county of Henry and State of Illinois, have invented certain new and useful Improvements in Corn-Uncoverers, of which the following is a specification.

My invention relates to improvements in agricultural implements, being more particularly an improvement in cultivating implements, and it consists in the constructions, combinations and arrangements herein described and claimed.

An object of my invention is to provide an attachment for cultivators, whereby the small corn plants may be uncovered, the clods destroyed, the weeds uprooted and the hill shaped, as the work of plowing or cultivating progresses.

Other objects and advantages will appear in the following specification, reference being had to the accompanying drawing in which—

Figure 1 is a perspective view of a cultivator with the invention attached,

Fig. 2 is a detail perspective view illustrating the operation of the uncoverer and Fig. 3 is a sectional view through the cultivator, illustrating the driving connections of the uncoverer.

Although the uncoverer may be employed in other connections than the one illustrated in the drawing, in the present instance it is applied to the yoke 1 of an ordinary cultivator. The manner of applying the uncoverer consists simply of using a pair of clips 2 which bind the bearings 3 of the uncoverer shaft 4 to the vertical portions of the yoke 1.

A gear 5 on one end of the uncoverer shaft 4 meshes with a gear 6 which is affixed in any suitable manner to the adjacent wheel 7 of the cultivator. The uncoverer 8 is therefore operated by one of the ground wheels of the cultivator.

The uncoverer 8 comprises a frame 9 with bearings 10 by means of which the uncoverer is hung on the shaft 4. Collars 11 keep the uncoverer in a central position on the shaft 4. Journaled in the lower end of the frame 9 is a shaft 12 upon which a pair of uncoverer rolls 13 are fixed.

The rolls 13 are separated so as to make room for the sprocket 14 to which the drive chain 15 is applied. The chain 15 is also applied to a sprocket 16 on the shaft 4, and by this means the rolls 13 are rotated as the cultivator moves over the ground. Spikes 17 arranged in spiral formation and becoming increasingly longer toward the outer ends of the rolls, are fixed in place on the rolls as shown. The function of the spikes is, to work away the clods, uproot the weeds and re-form the hill so as to uncover the young corn plants.

An idler sprocket 18 is intended to adjust the tension of the chain 15. The manner of mounting the idler sprocket may consist of any suitable arrangement for the purpose, the means shown in the drawing consisting simply of a slotted enlargement 19 on each of the members of the frame 9. The shaft of the sprocket 18 is adjustable in the slots of the enlargements.

In order to prevent the rolls 13 from bearing too heavily on the hill and the spikes from entering too deeply into the ground, an adjustable band 20 is provided attached to certain of the outer spikes. This band in each instance consists of a plurality of sections which have slotted extensions to coöperate with certain enlarged and slotted spikes. The bolts passing through the slots enable the fixing of the segments of the bands in the desired positions so as to gage the depth of penetration of the spikes.

A lever 22 pivoted in a bracket 23 on the yoke 1, has a rod 24 in connection with the frame 9, so as to enable the raising and lowering of the uncoverer. When in operation, the uncoverer rolls are allowed to simply rest on the ground, but a quadrant and detent are employed in connection with the lever, to hold the uncoverer in the raised position.

A resilient connection is embodied in the rod 24 in order to give the uncoverer a certain amount of play when running over the ground. In this connection, it will be observed that the quadrant just referred to, has but two recesses; one receiving the detent when the uncoverer is raised and the other receiving the detent when the uncoverer is lowered. The resilient connection comprises a spring 25 in a yoke 26 on the lower portion of the rod 24. The upper portion of the rod enters the yoke and has a head which bears on the spring. Obviously a sudden upward movement of the lower portion of the rod as when an obstruction is encountered by the rolls will be taken care of by the resilient connection in the rod.

I claim:

1. A corn uncoverer comprising a wheeled frame, driving means journaled on the frame and operated by one of the wheels, an uncoverer frame pivotally supported on the driving means, spaced uncoverer rolls journaled in the lower end of the frame and having spikes increasing in length toward the outer ends of the rolls to shape the hill, a driving connection extending from the driving means to the space between the rolls, means including a lever and quadrant with a rod connection from the lever, for supporting the uncoverer frame in a raised and lowered position, and resilient means embodied in said rod connection enabling a limited upward movement of the uncoverer frame as when the rolls encounter an obstruction, said means including a yoke in one portion of the rod, the other portion of the rod entering the yoke and having a head, and an interposed spring in the yoke above the head.

2. A corn uncoverer comprising a wheeled frame, an uncoverer shaft journaled on the frame, gear connections between the shaft and one of the wheels, a frame pivotally hung on the shaft, means for supporting the frame in raised and lowered positions, said means including a rod with a resilient connection enabling a slight upward movement of the frame when in the lowered position, spaced uncoverer rolls journaled in the lower end of the frame, a drive chain reaching from the shaft to the space between the rolls, the space beneath the drive chain at the rolls being sufficient to enable the passing of a small plant without crushing, spikes on the rolls increasing in length toward the ends of the rolls to form the hill, and adjustable means on the outermost spikes for gaging the depth of penetration of the spikes.

3. In a corn uncoverer, a pair of rolls provided with spikes arranged in spiral formation and increasing in length toward the ends of the rolls, and means mounted on certain ones of the outermost spikes for gaging the depth of penetration of the spikes, said means comprising a band consisting of a plurality of sections, and means for adjusting the sections including a pendent member on each section, an enlargement with a slot on one of the spikes, and securing members in the slot and pendent member.

OSCAR G. OPALKA.

Witnesses:

W. R. REHERD,
A. W. PETERSON.

Copies of this patent may be obtained for five cents each, by addressing the "Commissioner of Patents, Washington, D. C."